(12) United States Patent
Morey

(10) Patent No.: US 7,963,759 B1
(45) Date of Patent: Jun. 21, 2011

(54) MOLD BASE HOLD RETAINER AND METHOD OF USING

(75) Inventor: Norm E. Morey, North Branch, MI (US)

(73) Assignee: Custom Products Enterprises, Inc., North Branch, MI (US)

( * ) Notice: Subject to any disclaimer, the term of this patent is extended or adjusted under 35 U.S.C. 154(b) by 555 days.

(21) Appl. No.: 12/074,322

(22) Filed: Mar. 3, 2008

Related U.S. Application Data

(63) Continuation-in-part of application No. 11/606,519, filed on Nov. 29, 2006, now abandoned, and a continuation-in-part of application No. 11/712,201, filed on Feb. 27, 2007, now Pat. No. 7,614,873.

(51) Int. Cl.
*B28B 7/00* (2006.01)
*B29C 45/66* (2006.01)

(52) U.S. Cl. ............. 425/451.9; 425/595; 425/589; 425/192 R

(58) Field of Classification Search ........... 425/451.9, 425/595, 589, 192 R; 403/310, 311, 312, 403/313, 301
See application file for complete search history.

(56) References Cited

U.S. PATENT DOCUMENTS

| | | | |
|---|---|---|---|
| 1,785,495 A * | 12/1930 | Clement | 279/97 |
| 2,959,814 A * | 11/1960 | Budd | 192/116.5 |
| 3,706,116 A | 12/1972 | Drazick | |
| 3,737,268 A | 6/1973 | Ryder | |
| 3,844,703 A | 10/1974 | Hutter | |
| 3,945,620 A | 3/1976 | Ruegg | |
| 4,403,810 A | 9/1983 | Bieneck | |
| 4,704,078 A | 11/1987 | Hehl | |
| 4,765,585 A | 8/1988 | Wieder | |
| 5,114,329 A | 5/1992 | Nakamura et al. | |
| 5,397,226 A | 3/1995 | Vandenberg | |
| 5,494,435 A | 2/1996 | Vandenberg | |
| 6,116,891 A | 9/2000 | Starkey | |
| 6,431,852 B1 | 8/2002 | Vandenberg | |
| 6,491,512 B2 | 12/2002 | Vandenberg | |
| 6,921,256 B2 | 7/2005 | Bokich | |
| 7,229,269 B2 | 6/2007 | Cerniglia | |
| 2004/0178536 A1 | 9/2004 | Kato et al. | |
| 2005/0266111 A1 | 12/2005 | Ciccone et al. | |
| 2007/0087081 A1 | 4/2007 | Ichikawa | |

FOREIGN PATENT DOCUMENTS

| | | |
|---|---|---|
| EP | 1 619 412 A1 | 1/2006 |
| GB | 658488 | 10/1951 |
| JP | 2001038435 | 2/2001 |
| WO | WO 2004/097257 | 11/2004 |

* cited by examiner

*Primary Examiner* — Maria Veronica D Ewald
(74) *Attorney, Agent, or Firm* — T.L. Garrett, PLC; Tanya L. Garrett

(57) ABSTRACT

A locking device for use with first and second mold plates, comprising an upper block including an axial cavity adapted to receive an upper projection end and adapted to be affixed to a first mold plate; a projection having upper and lower projection ends; a base adapted to be secured to a second mold plate, including a longitudinal bore adapted to receive at least one roller actuator assembly and at least one biasing element therein, and a projection receiving bore adapted to receive the lower projection end; at least one roller actuator assembly adapted to mechanically engage the lower projection end; a plurality of biasing elements, each adapted to mechanically engage a roller actuator assembly and a retention plate; and a plurality of retention plates adapted to be secured to the base and retain at least one roller actuator assembly and at least one biasing element within the longitudinal bore.

17 Claims, 13 Drawing Sheets

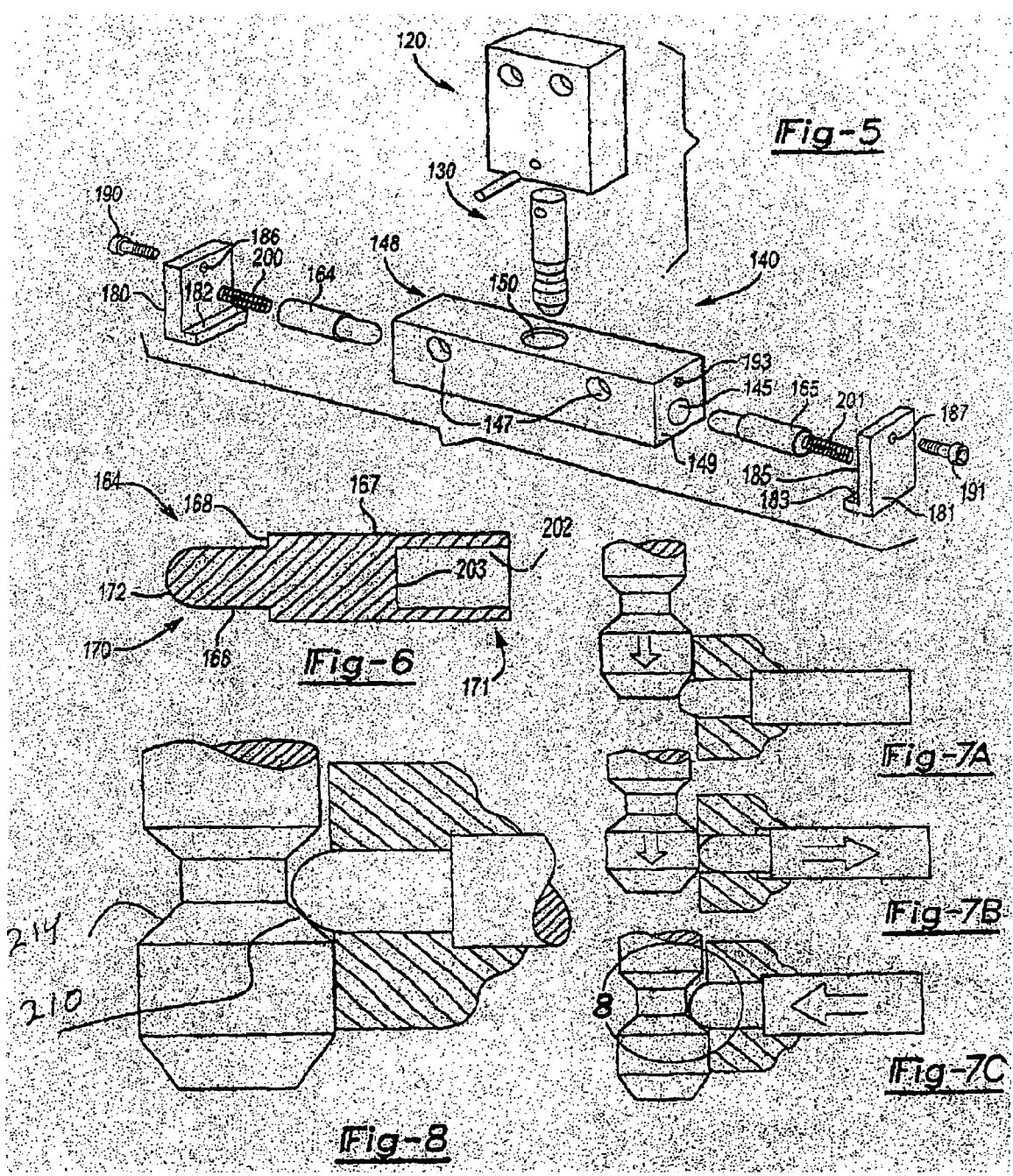

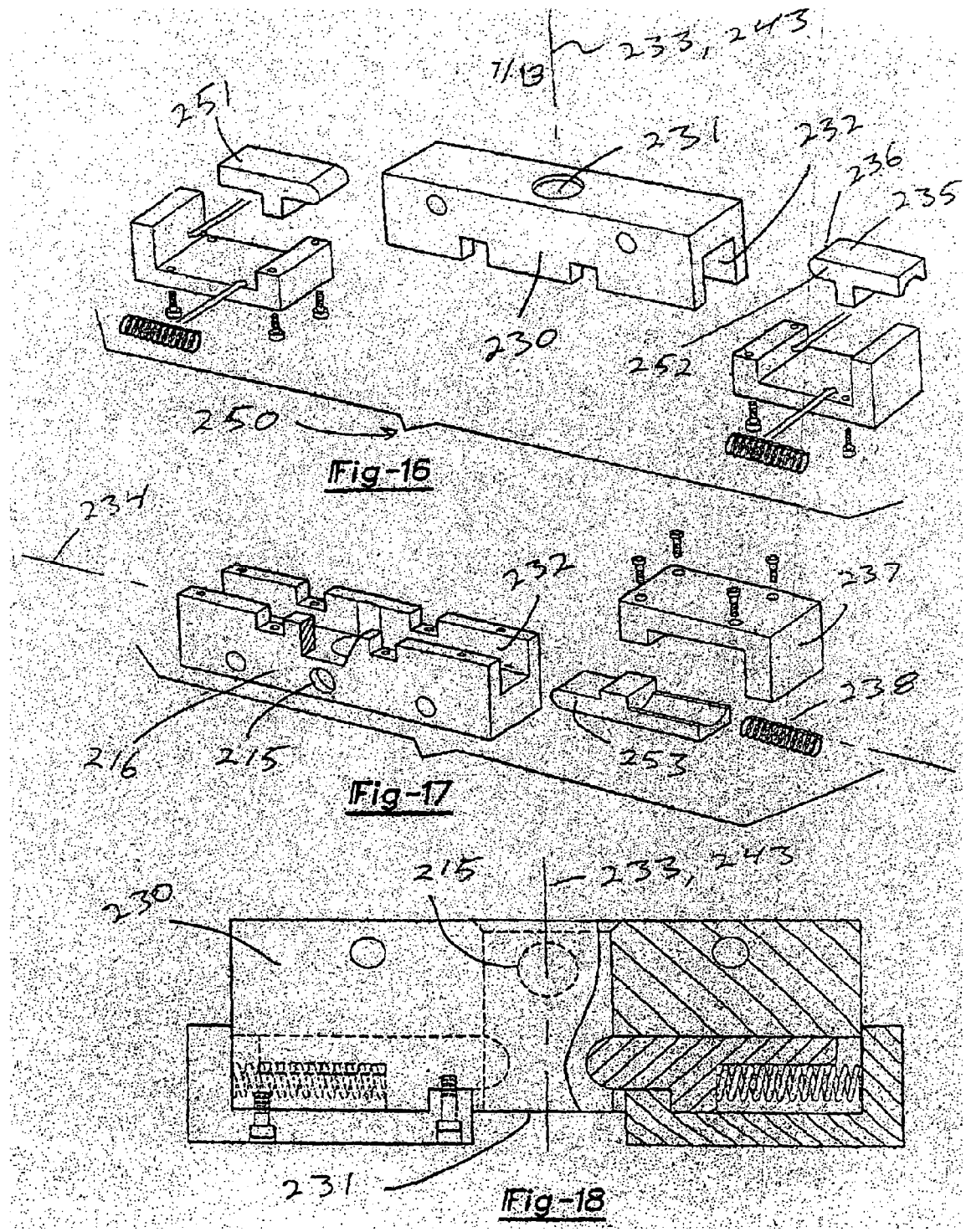

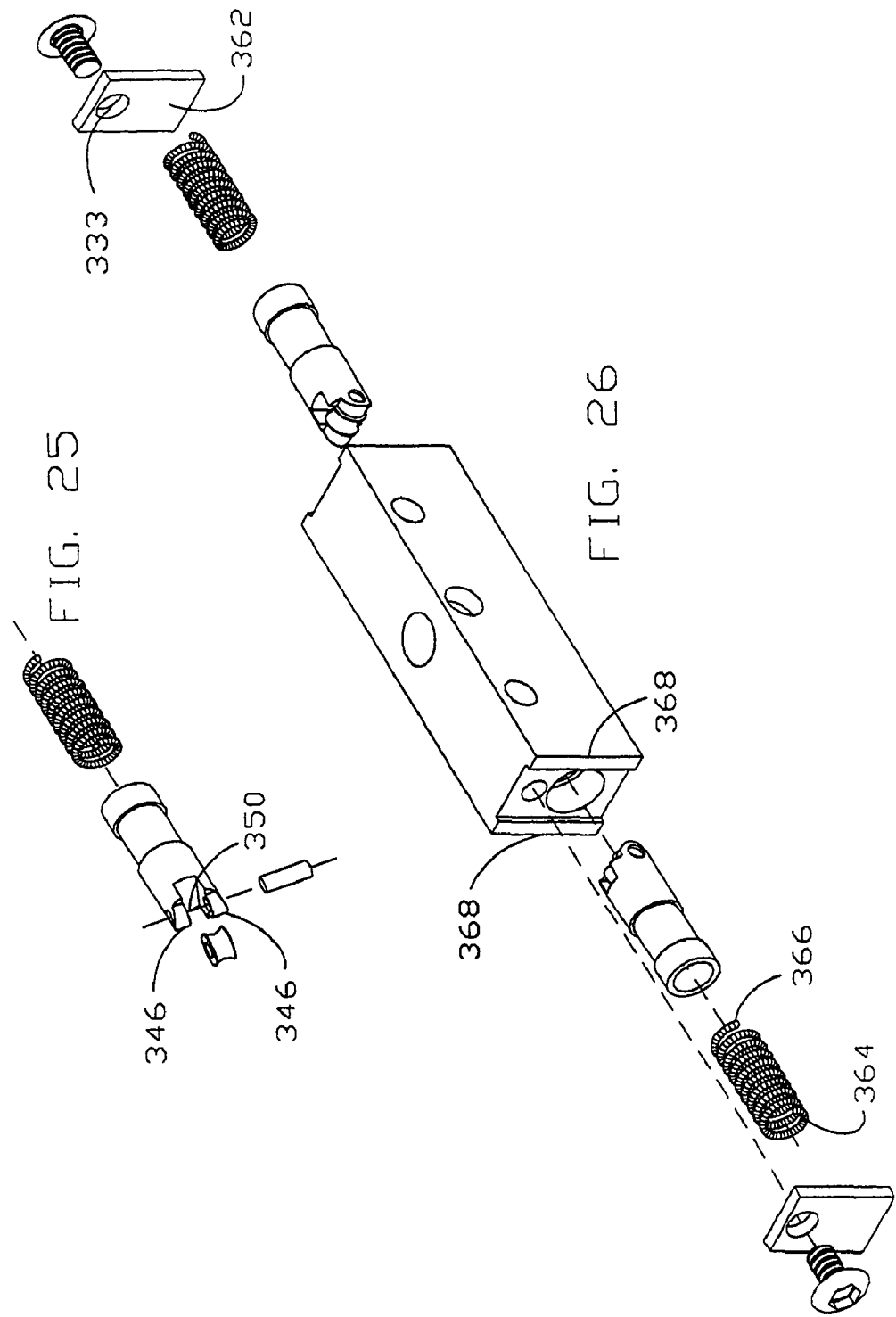

MOLD BASE HOLD RETAINER AND METHOD OF USING

CROSS-REFERENCE TO RELATED APPLICATIONS

This utility patent application is a continuation-in-part of previously filed U.S. Nonprovisional patent application Ser. No. 11/606,519, filed on Nov. 29, 2006 now abandonded. Nonprovisional patent application Ser. No. 11/606,519 is incorporated herein by reference in its entirety. This is a related application to CIP non-provisional patent application Ser. No. 11/712,201, filed on Feb. 27, 2007 now U.S. Pat. No. 7,614,873.

STATEMENT AS TO THE RIGHT TO INVENTIONS MADE UNDER FEDERALLY SPONSORED RESEARCH AND DEVELOPMENT

Not applicable.

TECHNICAL FIELD

This invention relates to injection molding machines, and more specifically to locking devices which affect the opening and closing of mold plates for injection molding machines.

BACKGROUND OF THE INVENTION

FIGS. 1-2 depict a prior art locking device 10 for an injection molding machine (not shown) having upper and lower mold plates 11, 12, respectively. Locking device 10 includes a base 40 having a longitudinal axis 72 and a vertical axis 74. Base 40 is attached to lower mold plate 12. This is accomplished via socket head cap screws 60; 61 which fit inside countersunk clearance holes 46, 47 of the base. The cap screws are then tightened appropriately. To assist with proper location of the base on the lower mold plate, locating pins 62, 63, projecting away from back surface 43, are mounted to the base. During installation of the base, locating pins 62, 63 are received by corresponding blind holes (not shown) in the lower mold plate. Base 40 has hole 52 extending therethrough which is substantially parallel to longitudinal axis L. Hole 52 is at least partially threaded, as shown at 53.

Internal slots 54, 55 (having inner limits 58, 59 and outer limits 56, 57, respectively) are proximate end of hole 52 and guide the axial displacement of cylindrical elements 64, 65 substantially parallel to the longitudinal axis during movement of rectangular projection 30 of block 20 into and out of rectangular opening 50 (as explained further below). Internal slots 54, 55 are aligned with hole 52, and furthermore intersect both hole 52 (end of hole 52) and rectangular opening 50.

Rectangular opening 50 is substantially parallel to vertical axis 74, and has a chamfered surface 51. Holes 48, 49 in front surface 42 of the base are used for installing cylindrical elements 64, 65 into the internal slots of the base. Biasing elements 66, 67 are within hole 52, captured between elements 64, 65 and adjustment screws 70, 71, respectively. Lock nuts 68, 69 keep adjustment screws 70, 71 from loosening during operation of the injection molding machine in order to maintain a force on the cylindrical elements that is directed towards vertical axis 74.

Block 20 is attached to upper mold plate 11. This is accomplished via socket head cap screws 27, 28 which fit inside countersunk clearance holes 24, 25 of the block. The cap screws are then tightened appropriately. To assist with proper location of the block on the upper mold plate, a locating pin 29 projecting away from back surface 23 is mounted within through hole 26 of the block. During installation of the block, locating pin 29 is received by a corresponding blind hole (not shown) in the upper mold plate. Block 20 has a rectangular projection 30 which extends perpendicularly away from lower surface 21 and fits into rectangular opening 50 of the base when locking device 10 is in a locked position (not shown). Rectangular projection 30 has a projection longitudinal axis 73. Together, upper and lower mold plates 11, 12 form a mold. In the locked position, the upper and lower mold plates are substantially in contact due to the injection molding machine's closing of the mold. The upper and lower mold plates remain in contact until a selected point of the injection molding cycle is reached when it is desirable to eject the molded part. Prior to or simultaneously with ejection, the die lock releases one mold plate from the other so that displacement of oen plate relative to the other and ejection may occur. When the selected point is reached, a "hard stop" in the die assembly is encountered (at a selected displacement of the mold plates). Here, the force created as the mold plates begin to separate and rectangular projection 30 begins to retract from base 40 causes the spring-loaded cylindrical elements to separate from pair of semicircular features 32 of rectangular projection 30, which unlocks the device. The rectangular projection is then withdrawn from the rectangular opening of the base by the continuing motion of the upper plate away from the lower plate.

SUMMARY OF THE INVENTION

A locking device for use with a first and second mold plate, comprising an upper block including an axial cavity integrally formed therein, the upper block adapted to be removably affixed to a first mold plate and further adapted to receive an upper projection end in the axial cavity; a projection having an upper projection end adapted to be received by the axial cavity, and a lower projection end adapted to be received by a projection receiving bore; a base adapted to be removably secured to a second mold plate, the base including a longitudinal bore adapted to receive at least one roller actuator assembly and at least one biasing element therein, and a projection receiving bore adapted to receive the lower projection end therein; at least one roller actuator assembly adapted to be received by the longitudinal bore and further adapted to mechanically engage the lower projection end; a plurality of biasing elements, each respective biasing element of the plurality of biasing elements adapted to mechanically engage at the least one roller actuator assembly and at least one retention plate; and a plurality of retention plates each adapted to be removably secured to the base and each being further adapted to retain the at least one roller actuator assembly and the at least one biasing element within the longitudinal bore. A method of use is also provided.

BRIEF DESCRIPTION OF THE FIGURES

FIG. 5 is an exploded view of the present invention.

FIG. 6 is a sectional side view for an actuator of the present invention.

FIG. 7A is a partly-sectional side view for selected components of the present invention in a first unlocked position.

FIG. 7B is a partly-sectional side view for selected components of the present invention in a second unlocked position.

FIG. 7C is a partly-sectional side view for selected components of the present invention in a locked position.

FIG. 8 is an enlarged partly-sectional side view for selected components of the present invention in the locked position of FIG. 7C.

FIG. 16 is an exploded view for the embodiment of FIG. 15.

FIG. 17 is another exploded view for the embodiment of FIG. 15.

FIG. 18 is a partly-sectional side view for the embodiment of FIG. 15 in an unlocked position.

FIG. 25 is an exploded view of a roller actuator assembly including a perpendicular shoulder in accordance with an embodiment of the invention.

FIG. 26 is a partial exploded view of a locking device base in accordance with an embodiment of the invention.

DETAILED DESCRIPTION OF THE INVENTION

Figure 1:
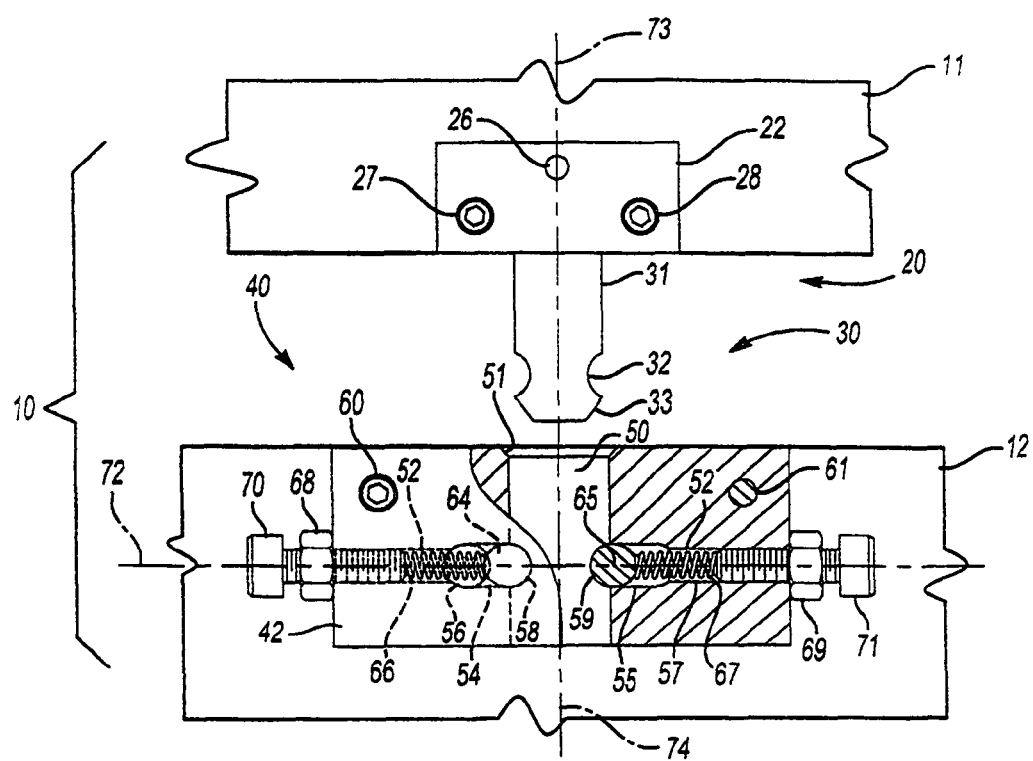
FIG. 1 is a partly-sectional front view of a prior art locking device in an unlocked position.
Figure 2:
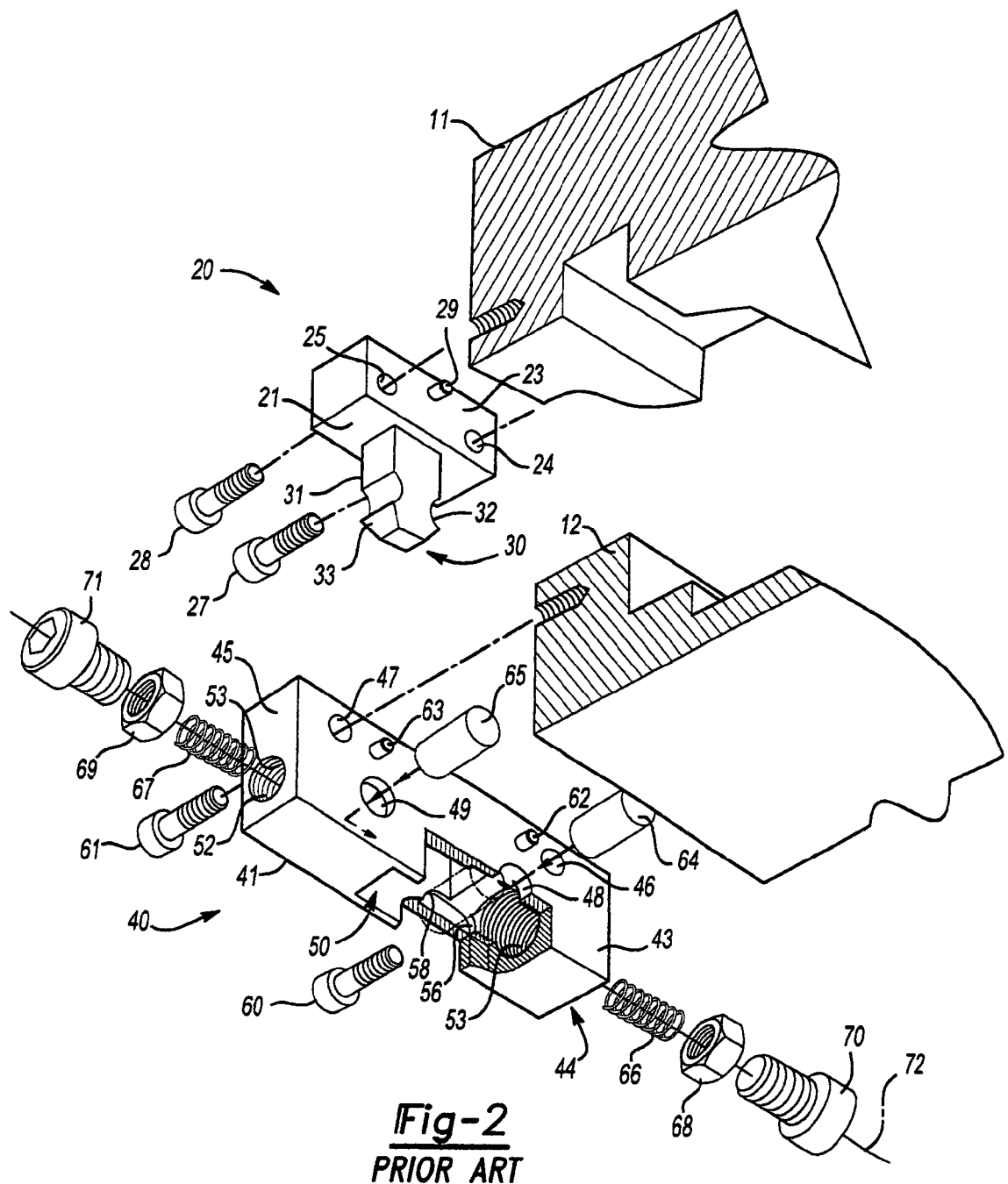
FIG. 2 is an exploded view, partly in section, of the prior art device of FIG. 1.
Figure 4:
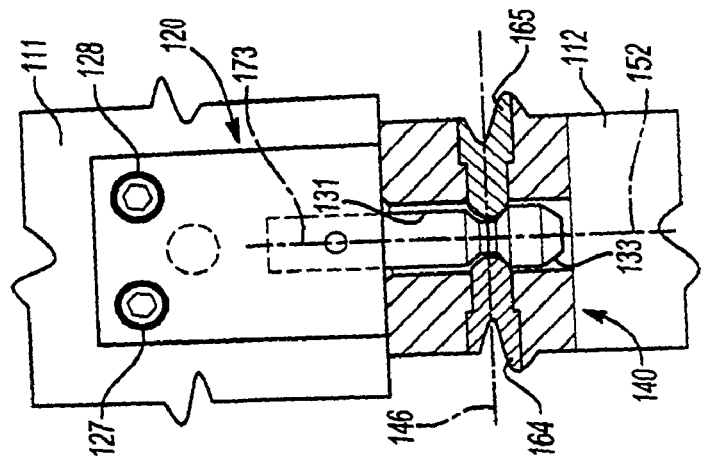
FIG. 4 is a partly-sectional front view of the present invention in a locked position.
Figure 3:
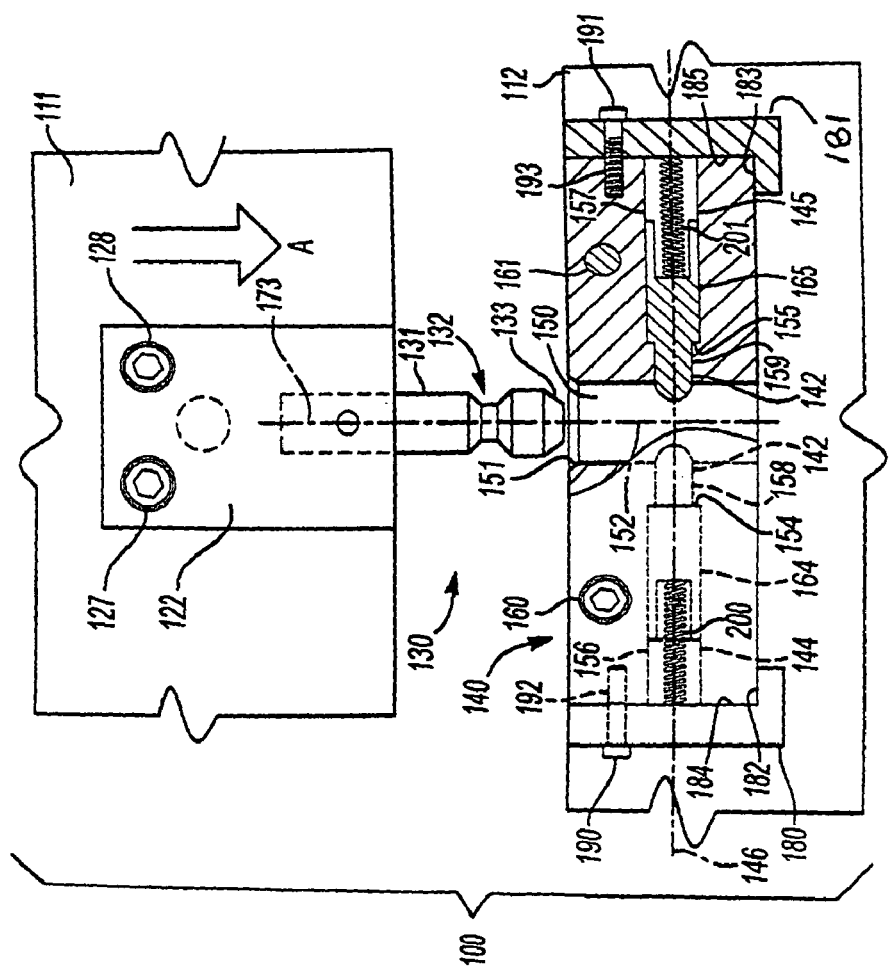
FIG. 3 is a partly-sectional front view of the present invention in an unlocked position.
Figures 9, 10:
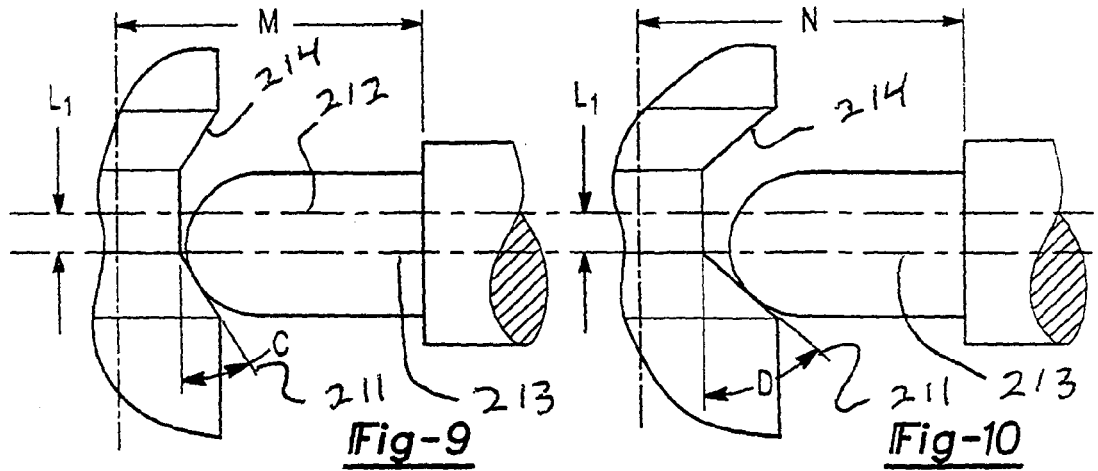
FIG. 9 is an enlarged side view for selected components of the present invention in a first locked position.
FIG. 10 is an enlarged side view for selected components of the present invention in a second locked position.
Figure 11:
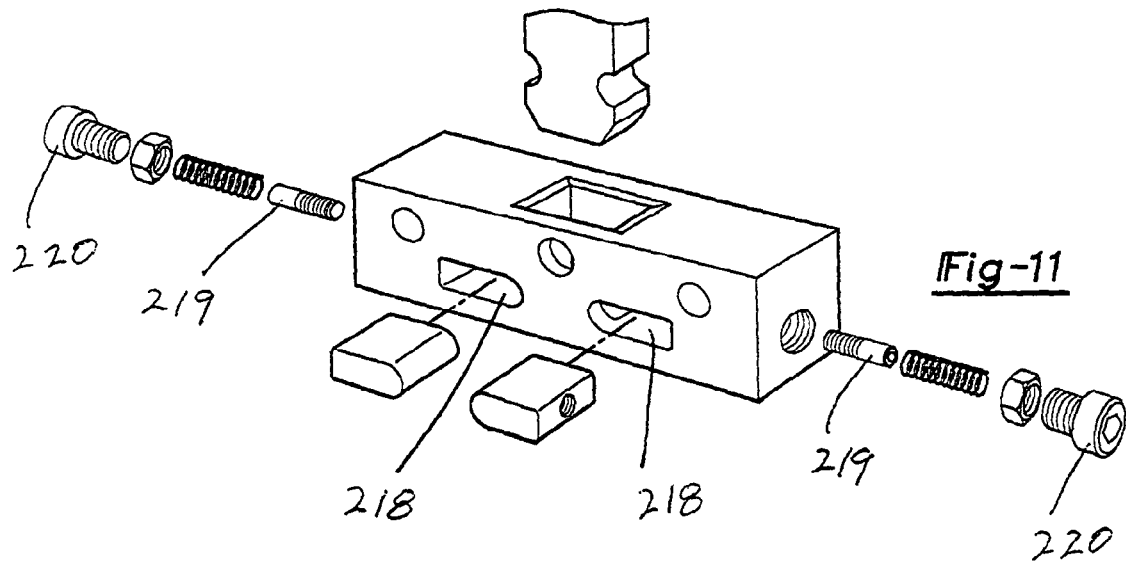
FIG. 11 is an exploded view for another embodiment of the present invention.
Figure 12:
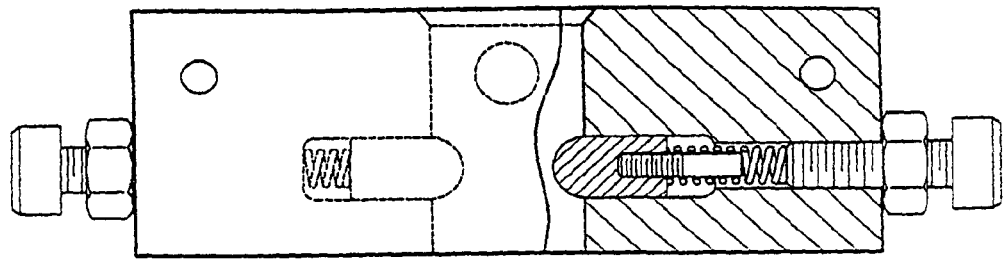
FIG. 12 is a partly-sectional side view of the embodiment of FIG. 11 in an unlocked position.
Figure 13:
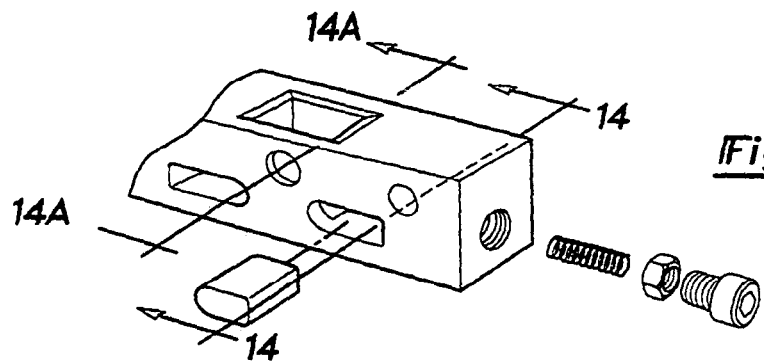
FIG. 13 is an exploded partial view for yet another embodiment of the present invention.

Referring to FIGS. 3-5, the present invention is a locking device for two or more plate-like components of an injection molding machine. These plate-like components include, for example, two mold plates 111, 112 (which may have core and cavity inserts—not shown) that are used to form a desired injection molded component. Locking device 100 is comprised of base 140 having longitudinal axis 146 and vertical axis 152. Base 140 is made of a metal such as steel or aluminum, and various alloys thereof, which are sufficiently wear-resistant to have an extended life in a continuous-use, manufacturing environment. Base 140 is mounted on lower mold plate 112. This is accomplished via socket head cap screws 160, 161 which fit inside countersunk clearance holes 146, 147 of the base. The cap screws are then tightened appropriately. Base 140 has first bore 142 extending therethrough which is substantially parallel to longitudinal axis 146. First bore 142 can be a substantially round hole, or any of various other geometries including substantially oval, substantially square and substantially rectangular. If the first bore is substantially round, then substantially round counterbore 144 in coaxial relationship with first bore 142 is included. A corresponding counterbore 145 is also shown in FIG. 3, as locking device 100 may be alternately constructed using multiple sets (or multiple subsets) of working components. As shown in FIG. 3, the locking device or die lock may be constructed using two such sets in substantially symmetric relationship, however this is only one of various arrangements that could be devised to carry out the objects of the present invention. If the first bore is not substantially round, then a counterbore (not shown) of the same generic geometry in coaxial relationship with the first bore, and having the function of substantially round counterbore 144 described further herein, is included.

Base 140 further includes second bore 150 extending therethrough which is substantially parallel to vertical axis 152. As with first bore 142, second bore 150 can be a substantially round hole, or any of various other geometries including substantially oval, substantially square and substantially rectangular.

First bore 142 has a first bore centerline 146, and the second bore 150 has a second bore centerline 152. The first bore centerline and second bore centerline intersect. The present invention also contemplates variations such that the centerlines substantially intersect, without seriously/substantially affecting the operation and performance of the invention. Furthermore, first and second bore centerlines may intersect substantially orthogonally, or at other selected angles such as, for example, about 80 degrees, about 70 degrees or about 60 degrees or less. Base 140 furthermore has sides 148, 149 that are spaced apart from vertical axis 152. Counterbores 144, 145 or other recesses (not shown) extend from their respective sides 148, 149 away from the second bore centerline (partway to second bore centerline 152) so as to form abutting shoulders 154, 155 within base 140. Counterbore forms a counterbore wall/an inner wall 156, 157 within the base. First bore forms a first bore wall 158, 159 within the base.

The present invention further includes an actuator or slide 164. A corresponding actuator 165 is also shown in FIG. 3, as locking device 100 may be alternately constructed using multiple sets (or multiple subsets) of working components, as stated above. The actuator can be a substantially round, or any of various other geometries including substantially oval, substantially square and substantially rectangular. Actuator 164 is made of a metal such as steel or aluminum, and various alloys thereof, which are sufficiently wear-resistant to have an extended life in a continuous-use, manufacturing environment. One preferred material for the actuator is oil-hardened tool steel. Referring to FIG. 6, actuator 164 has first and second portions 166, 167 respectively. First portion 166 has a first selected cross-sectional area, and second portion 167 has a second selected cross-sectional area, wherein the first selected cross-sectional area is less than the second selected cross-sectional area. In one embodiment, first portion 166 has a first selected diameter and second portion 167 has a second selected diameter. The first selected diameter is less than the second selected diameter, therefore shoulder 168 is formed at the interface between first and second portions 166, 167. First and second portions can also have other geometries besides substantially round, including substantially oval, substantially square and substantially rectangular. First and second portions are typically, but not necessarily, in substantially coaxial relationship.

Actuator 164 furthermore has first and actuator second ends 170, 171 in opposing relationship. Actuator first end 170 has a substantially curved surface 172 which is substantially convex in nature. In one embodiment the substantially curved surface 172 is substantially hemispherical in nature, although other geometries are also contemplated by the present invention, including ellipsoid, ovaloid, etc. For the embodiment of FIGS. 3-4, when actuator 164 is assembled within base 140, first portion 166 is located within bore 142 and second portion 167 is within counterbore 144. Typically second portion 167 is in sliding communication with counterbore wall/inner wall First portion 166 may be in sliding communication with first bore wall AAA The present invention further includes member 180. A corresponding member 181 is also shown in FIG. 3, as locking device 100 may be alternately constructed using multiple sets (or multiple subsets) of working components, as stated above. Member 180 is made of a metal such as steel or aluminum, and various alloys thereof, which are sufficiently wear-resistant to have an extended life in a continuous-use, manufacturing environment. Member 180 at least partly covers first bore 142, substantially enclosing counterbore 144. Member 181 at least partly covers first bore 142, substantially enclosing counterbore 145. Means for attaching members 180, 181, to the base may also be supplied, such as by screws 190, 191, respectively. Alternatively, other means for connecting may be provided, such as welding, pinning, riveting, staking, tongue-and-groove, or other means of semipermanently or permanently joining the member to the base. When the member is connected to the side via its appropriate means, the member may, or may not, be in contact with the side. The members may comprise first and second surfaces, wherein the first surface and the second surface are substantially perpendicular, further wherein the first and second second surfaces abut the base so as to substantially retain the position of the member with respect to the first bore and respective counterbore, preventing rotation of the member and subsequent loss of spring tension on the actuator.

Biasing element 200 is located within counterbore 144 between actuator second end 171 and member 180. The biasing element may be a helical spring. A corresponding biasing element 201 is also shown in FIG. 3, as locking device 100 may be alternately constructed using multiple sets (or multiple subsets) of working components. Biasing element 200 may or may not be preloaded when fully assembled within the locking device. This magnitude of preloading is a factor which affects the force at which the present invention unlocks (or unlatches) When the biasing element is at least partially compressed or preloaded it urges the actuator into the counterbore/toward the second bore centerline urges the first portion/actuator first end toward the second bore centerline.

When the biasing element is not at least partially compressed or preloaded it does not urge the actuator into the counterbore/toward the second bore centerline do not urges the first portion/actuator first end toward the second bore centerline. However, in this case the biasing elements do act to restore the actuators to a position in which the actuator first end protrudes into the second bore after the actuator first end has been substantially displaced out of the second bore by the projection.

In another embodiment, actuator second end 171 further comprises blind bore 202 extending therefrom into second portion 167, blind bore forming inner end wall 203 within second portion. The first portion, the second portion and the blind bore are typically, but not necessarily, in substantially coaxial relationship. Furthermore, first portion is within first bore and second portion is within counterbore, with biasing element captured/constrained/retained between/by inner end wall and member.

The locking device further comprises block and rectangular projection. Block and rectangular projection are made of a metal such as steel or aluminum, and various alloys thereof, which are sufficiently wear-resistant to have an extended life in a continuous-use, manufacturing environment. Projection has first and second projection ends and projection longitudinal axis. First projection end is located proximally with respect to block and is substantially rigidly connected to it. Second projection end is located distally with respect to block and fits in/within second bore during at least part of the injection molding machine cycle. Second projection end has elongated groove, and taper located distally with respect to elongated groove. In one embodiment, elongated groove has surface with a substantially straight portion. Substantially straight portion is substantially at a selected angle from the projection longitudinal axis. This angle may be an oblique angle. Actuator first end is in contact with surface when actuator first end engages surface/locking device is (in a locked position). The selected angle affects the force at which the locking device unlocks. As the selected angle increases for a particular embodiment of the present invention, the unlocking force also increases. In one embodiment, the selected angle is from about 40 degrees to about 50 degrees. In another embodiment, the selected angle is from about 30 degrees to about 60 degrees. In another embodiment, the selected angle is from about 20 degrees to about 70 degrees. In another embodiment, the elongated groove has a surface with a substantially nonstraight/curved/arcuate portion.

Figure 14:
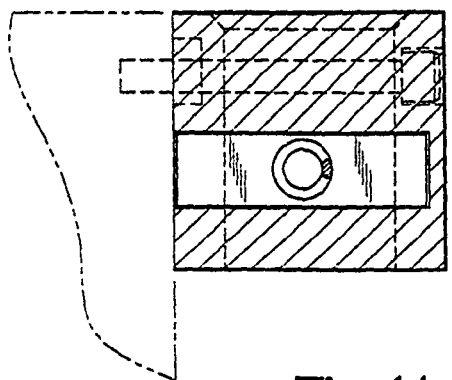
FIG. 14 is a sectional view for the embodiment of FIG. 13 as seen along line 14-14.
Figure 14A:
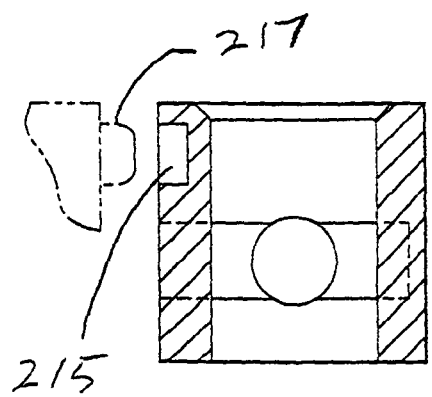
FIG. 14A is a sectional view for the embodiment of FIG. 13 as seen along line 14A-14A.
Figure 15:
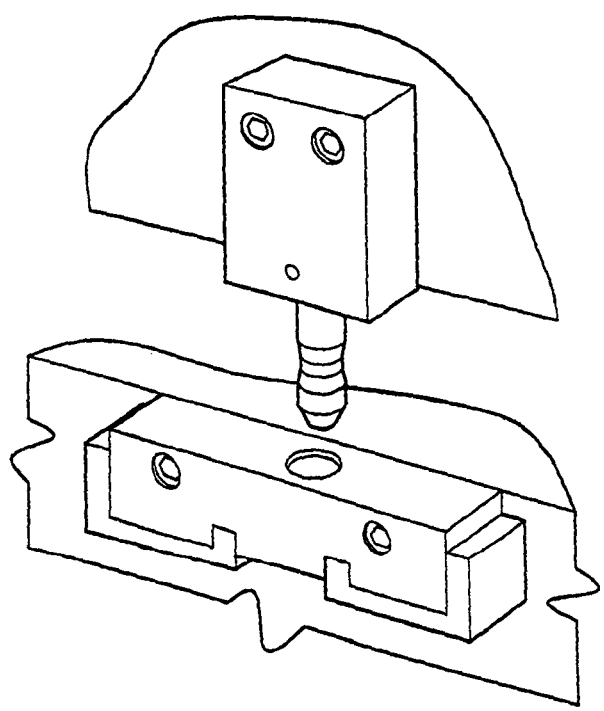
FIG. 15 is an isometric view for yet another embodiment of the present invention in an unlocked position.
Figure 20:
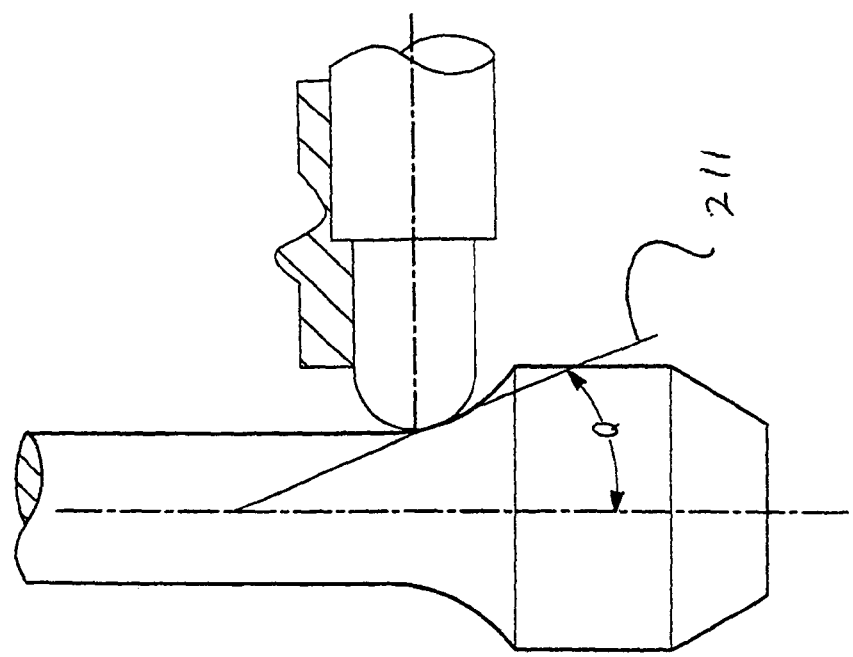
FIG. 20 is an enlarged partly-sectional side view for selected components for yet another embodiment of the present invention in a locked position.
Figure 19:
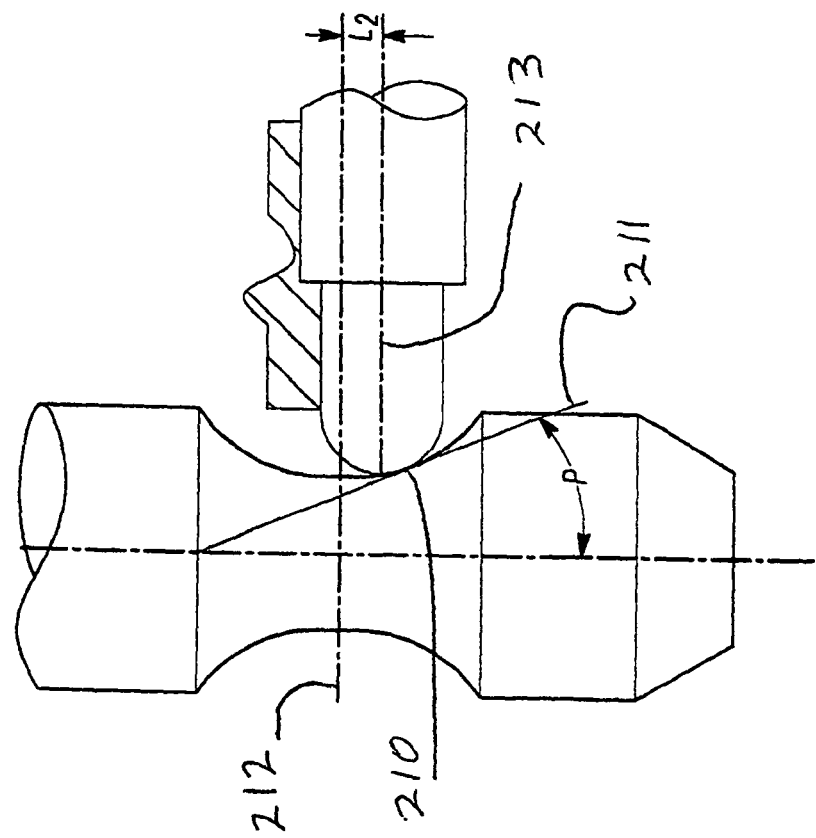
FIG. 19 is an enlarged partly-sectional side view for selected components for yet another embodiment of the present invention in a locked position.

(refer to FIGS. 14-14A, "this also applies to previously described embodiments shown in FIGS. 3-5): To assist with proper location of the base on the lower mold plate, blind recess in back surface is aligned with and fits over a corresponding locating pin, previously installed on an edge of the lower mold plate. During installation of the base, locating pin is received by blind recess.

Referring to FIGS. 16-18, a locking device for first and second mold plates of an injection molding machine is disclosed, comprising a base 230 attached to the first mold plate, the base having a bore 231 and a channel 232 extending therethrough, the bore and the channel having first and second centerlines, 233, 234, respectively, wherein the first centerline substantially intersects the second centerline. An actuator 235 has an actuator first end 236, wherein actuator 235 is within channel 232. A corresponding actuator 251 is also shown in FIGS. 16-18, as locking device 250 may be alternately constructed using multiple sets (or multiple subsets) of working components. As shown in FIGS. 16-18, the locking device or die lock may be constructed using two such sets in substantially symmetric relationship, however this is only one of various arrangements that could be devised to carry out the objects of the present invention. A carrier 237 for the actuator at least partly covers channel 232. A biasing element 238 is located between the actuator and the carrier. Similarly to FIGS. 3-8, a block (not shown) is attached to the second mold plate, the block having a projection (not shown) with projection first and second ends and a projection longitudinal axis 243, wherein the projection first end is substantially rigidly connected to the block, wherein the projection second end fits within the bore, the projection second end comprising a projection contact surface (not shown).

The actuator may have sides 252, 253 which are in sliding communication with channel 232. Furthermore, actuator first end 236 is substantially concave. Furthermore, the actuator may have a concave surface in which the biasing element can nest, which may permit a smaller package size to be designed for the die lock. The actuator has a wall which is substantially perpendicular to the longitudinal axis of the actuator. The biasing element may be captured between the wall and the carrier as shown in FIG. 18.

In one embodiment of the invention, illustrated in FIGS. 21-31, a locking device 300 is provided. The locking device 300 may include an upper block 302, the upper block 302 adapted to be removably affixed to a first mold plate 111 and further adapted to receive an upper projection end 308 in an axial cavity 306 integrally formed therein; a projection 304 having an upper projection end 308 and a lower projection end 310; a base 312, the base 312 adapted to be removably secured to a second mold plate 112 and including a longitudinal bore 314 adapted to receive at least one roller actuator assembly 316 and at least one biasing element 318 therein and a projection receiving bore 320 adapted to receive the lower projection end 310 therein; at least one roller actuator assembly 316, the at least one roller actuator assembly 316 adapted to be received by the longitudinal bore 314 and further adapted to mechanically engage the lower projection end 310; a plurality of biasing elements 318, each respective biasing element 318 of the plurality of biasing elements 318 adapted to mechanically engage the at least one roller actuator assembly 316 and at least one retention plate 322; and a plurality of retention plates 322, the plurality of retention plates 322 each adapted to be removably secured to the base 312 and each being further adapted to retain the at least one roller actuator assembly 316 and the at least one biasing element 318 within the longitudinal bore 314.

Turning now to FIGS. 21-31, a locking device 300 is illustrated. The locking device 300 includes an upper block 302. In one embodiment of the invention, illustrated in FIGS. 22-24, the upper block 302 includes an axial cavity 306, the axial cavity 306 adapted to receive and mechanically engage the upper projection end 308 therein. The upper block 302 may include means for removably securing the upper block 302 to a first mold plate 111.

Figure 22:
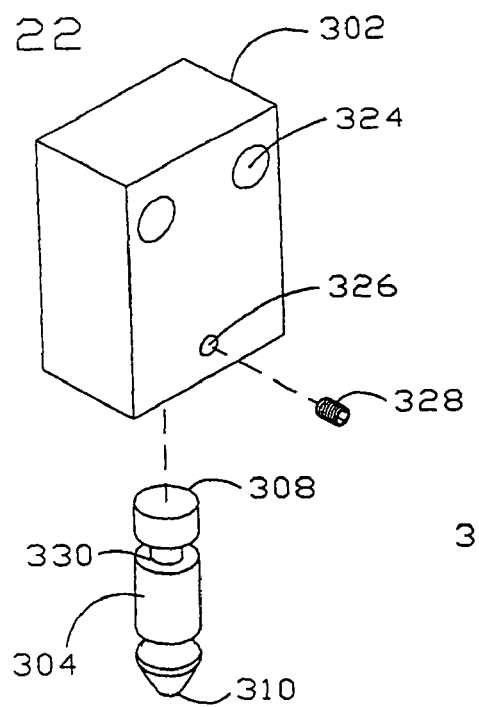
FIG. 22 is an exploded view of an upper block in accordance with an embodiment of the invention.
Figure 23:
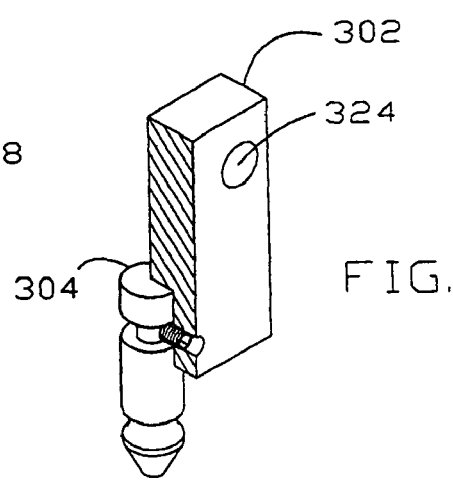
FIG. 23 is a partial sectional view of an upper block in accordance with an embodiment of the invention.
Figure 24:
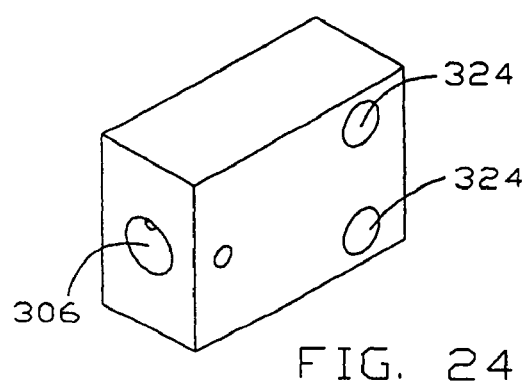
FIG. 24 is a perspective view of an upper block in accordance with an embodiment of the invention.

In one embodiment of the invention, illustrated in FIGS. 22-24, a means of removably securing the upper block 302 to the first mold plate 111 includes at least one upper block mounting hole 324, the at least one upper block mounting hole 324 adapted to pass a mechanical fastener therethrough, such that the upper block 302 may be removably secured to the first mold plate 111 by a bolt or other mechanical fastener mechanically engaging a corresponding mechanical fastening means formed upon the first mold plate 111 as is commonly known in the art.

In another embodiment of the invention, the upper block 302 may be welded or similarly fixably secured to the upper mold plate as is commonly known in the art.

In one embodiment of the invention, illustrated in FIGS. 22 and 23, the upper block 302 includes a projection retainer bore 326 formed transversely in the upper block 302. The projection retainer bore 326 may be adapted to receive and mechanically engage a helically-threaded set screw 328 via corresponding helical threads. The set screw 328 may operate to mechanically engage a projection rebated portion 330 and the projection retainer bore 326, as illustrated in FIG. 23, whereby the projection 304 is retained in a fixed orientation with respect to the upper block 302.

In one embodiment of the invention, illustrated in FIGS. 22 and 23, the projection 304 may include a projection rebated portion 330, the projection rebated portion 330 forming a portion of the projection 304 having a substantially smaller diameter than that of the body of the projection 304, and adapted to mechanically engage a threaded set screw 328, as illustrated in FIG. 23. The projection rebated portion 330 may be located nearer the upper projection end 308 than the lower projection end 310.

In one embodiment of the invention, the projection 304 may be hardened by hardening methods as are commonly known in the art. The projection 304 may be hardened to a hardness ranging between and including 40 and 70 on the Rockwell C hardness scale, as is commonly known in the art.

In one embodiment of the invention, each of the projection 304 and the upper block 302 may be formed from materials having associated properties selected from one or more of the following properties: wear resistance, resistance to elevated temperatures, desirable machinability characteristics, and sufficiently rigid structure. Examples of materials of which the projection 304 and the upper block 302 may be formed include, but are not limited to: steel, aluminum, and other metals.

In an embodiment of the invention, illustrated in FIGS. 21, 26, 28, and 30, the base 312 may be adapted to be removably affixed to a lower mold plate 112 and may include a longitudinal bore 314, the longitudinal bore 314 adapted to receive at least one roller actuator assembly 316 and at least one biasing element 318 therein; at least one limiting counterbore 328, the at least one limiting counterbore 328 formed coaxially with the longitudinal bore 314; a projection receiving bore 320, the projection receiving bore 320 adapted to receive the lower projection end 310 therethrough; at least one base mounting hole 329, the base mounting hole 329 adapted to receive a mechanical fastener therethrough such that the mechanical fastener operates to removably secure the base 312 to the lower mold plate by mechanically engaging a corresponding mechanical fastener formed or affixed to the lower mold plate; and at least one retention member mounting hole 332, the retention member mounting hole 332 adapted to receive a mechanical fastener therethrough.

In one embodiment of the invention (not shown), the base 312 may be formed without at least one base mounting hole 329, and instead may be securably affixed to the lower mold plate by welding or by other suitable means of securably affixing the base 312, as are commonly known in the art.

In one embodiment of the invention, the base 312 may be formed from materials having associated properties selected from one or more of the following properties: wear resistance, resistance to elevated temperatures, desirable machining characteristics, and sufficiently rigid structure. Examples of materials of which the base 312 may be formed include, but are not limited to: steel, aluminum, and other metals.

In one embodiment of the invention, illustrated in FIGS. 21 and 25-31, the locking device 300 includes at least one roller actuator assembly 316.

In one embodiment of the invention, each of the at least one roller actuator assemblies includes a roller actuator body 334, the roller actuator body 334 adapted to be received in sliding engagement with the longitudinal bore 314 of the base 312 and having a body distal end 336 and a body proximate end 338, the body proximate end 338 adapted to receive an axle 340 therein; a roller 342, the roller 342 having a transverse axle receiving bore 344 centrally formed therethrough and adapted to receive an axle 340; and an axle 340, the axle 340 adapted to mechanically engage a pair of diametrically-opposed bearing surfaces 346 formed in the body proximate end 338 and further adapted to mechanically engage the axle receiving bore 344 of the roller 342.

In an embodiment of the invention, the sliding engagement between the roller actuator assembly 316 and the longitudinal bore 314 may permit the roller actuator assembly 316 to freely pivot within the longitudinal bore 314. By freely pivoting within the longitudinal bore 314, the roller actuator assembly 316 may pivot into alignment with the projection 304.

In one embodiment of the invention, each respective roller actuator assembly 316 may be formed from materials having associated properties selected from one or more of the following properties: wear resistance, resistance to elevated temperatures, desirable machining characteristics, and sufficiently rigid structure. Examples of materials of which each respective roller actuator may be formed include, but are not limited to: steel, aluminum, and other metals.

Figure 27:
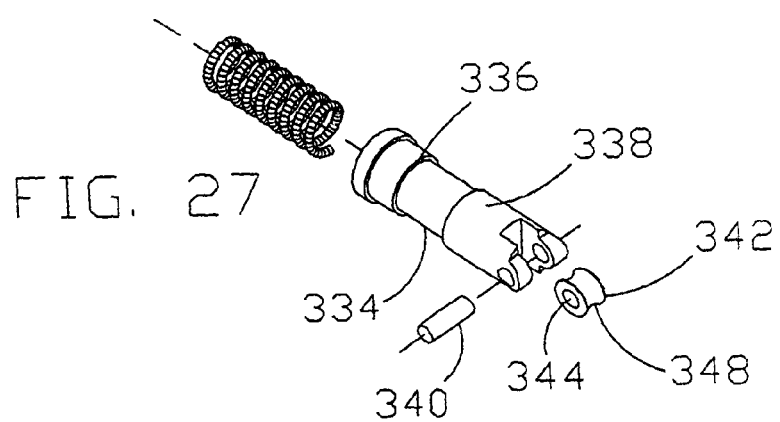
FIG. 27 is an exploded view of a roller actuator assembly including a rim portion in accordance with an embodiment of the invention.

In one embodiment of the invention, illustrated in FIG. 27, the roller 342 may include a concave circumferential perimeter 348, the concave perimeter 348 of the roller 342 may be adapted to engage the projection 304 such that both frictional and impact forces upon both the projection 304 and the roller 342 are reduced during operation of the locking device 300.

In one embodiment of the invention, each respective roller 342 may be hardened by hardening methods as are commonly known in the art. Each respective roller 342 may be hardened to a hardness ranging between and including 40 and 70 on the Rockwell C hardness scale, as is commonly known in the art.

In one embodiment of the invention, the axle 340 may be formed as a cylindrical body, as illustrated in FIGS. 25 and 27. The axle 340 operates to mechanically engage a pair of diametrically-opposed bearing surfaces 346 formed in a body proximate end 338, the bearing surfaces 346 cooperating to form a yoke 350.

In one embodiment of the invention, the axle 340 may be frictionally retained in the yoke 350. Frictional retention of the axle 340 may require a user to press the axle 340 into the yoke 350. The axle 340 may be pressed into the yoke 350 by pressing methods commonly known in the art, including, but not limited to: using a hydraulic press.

In another embodiment of the invention, the axle 340 may be retained in the bearing surfaces 346 by a "slip fit". A "slip fit", as defined herein, includes clearance between the yoke 350 and the axle 340 such that the axle 340 need not be pressed into the yoke 350, but rather may be slid into the yoke 350 by a user's hand or urged into position using a pointed object. A "slip fit" between the axle 340 and the yoke 350 may also allow a user to extract the axle 340 from the yoke 350 easily, allowing for easy replacement of the roller 342 or axle 340.

In one embodiment of the invention, each respective axle 340 may be hardened by hardening methods as are commonly known in the art. Each respective axle 340 may be hardened to a hardness ranging between and including 40 and 70 on the Rockwell C hardness scale, as is commonly known in the art.

Figure 28:
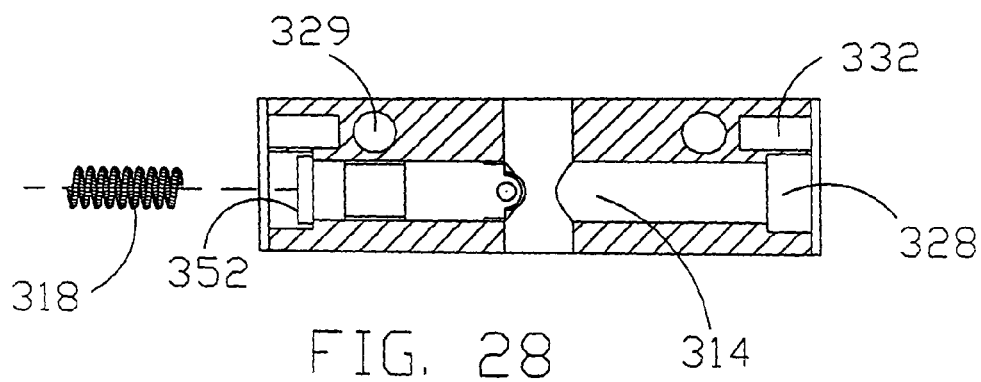
FIG. 28 is a cross-sectional view of a base including a limiting counterbore in accordance with an embodiment of the invention.

In one embodiment of the invention, illustrated in FIGS. 27 and 28, the roller actuator body portion 334 may include a rim portion 352, the rim portion 352 formed at a body distal end 336 and extending radially outward therefrom and adapted to engage a limiting counterbore 328 formed in the base 312. The rim portion 352 may operate to limit the travel of the roller actuator assembly 316 in the direction of the projection receiving bore 320 within the longitudinal bore 314.

Figure 29:
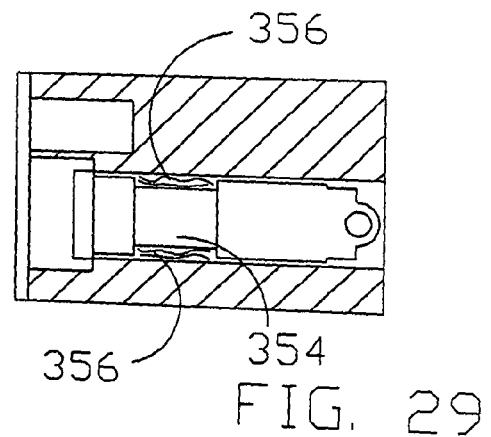
FIG. 29 is a partial cross sectional view of a locking device including a roller actuator assembly having an actuator rebated portion in accordance with an embodiment of the invention.

In another embodiment of the invention, illustrated in FIG. 29, each of the at least one roller actuator body portions 334 may include an actuator rebated portion 354, the actuator rebated portion 354 may be formed as a portion of the actuator body portion 334 having a smaller diameter than that of the remainder of the actuator body portion. The actuator rebated portion 354 may be adapted to retain a lubricant 356 therein, as illustrated in FIG. 29. Retention of lubricant 356 by the actuator rebated portion 354 may operate to provide decreased friction between the roller actuator assembly 316 and the longitudinal bore 314. Decreased friction between the roller actuator assembly 316 and the longitudinal bore 314 resulting from the retention of lubricant 356 by the actuator rebated portion 354 may provide decreased wear upon both the longitudinal bore 314 and the roller actuator assembly 316. Examples of a lubricant may include, but are not limited to: grease, machine oil, and dry lubricants.

Figure 31:
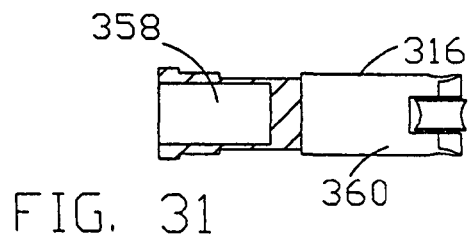
FIG. 31 is a partial cross sectional view of roller actuator assembly including a biasing member receiving cavity in accordance with an embodiment of the invention.

In another embodiment of the invention, illustrated in FIG. 31, the roller actuator body portion 334 may include a biasing element receiving cavity 358. The biasing element receiving cavity 358 may be integrally formed with the roller actuator body portion 334 and may be adapted to receive a biasing element 318 therein. The biasing element receiving cavity 358 may be formed in the roller actuator body portion 334 as a blind hole, extending axially from a body distal end 336 toward a body proximate end 338.

In one embodiment of the invention, illustrated in FIGS. 27 and 28, the roller actuator body portion 334 may include a rim portion 352, the rim portion 352 formed at a body distal end 336 and extending radially outward and adapted to engage a limiting counterbore 328 formed in the base 312. The rim portion 352 may operate to limit the travel of the roller actuator assembly 316 in the direction of the projection receiving bore 320 within the longitudinal bore 314.

In an embodiment of the invention including at least one roller actuator including a rim portion 352, the base 312 may include a limiting counterbore 328. FIG. 28 illustrates the rim portion 352 mechanically engaging the limiting counterbore 328 of the base 312. The limiting couunterbore may operate to limit the travel of the roller actuator in the direction of the projection receiving bore 320.

In an embodiment of the invention, illustrated in FIGS. 21 and 25-31, travel of the roller actuator in a direction away from the projection receiving bore 320 within the longitudinal bore 314 of the base 312 is limited by a retention plate 322, the retention plate 322 adapted to be removably secured to the base 312 and having a generally rectangular form and a retention plate mounting hole 333 integrally formed therein. The retention plate mounting hole 333 may be adapted to allow a mechanical fastener to pass therethrough, wherein the mechanical fastener then engages a retention plate mounting hole 333 formed in the base 312. The retention plate 322 may include a retention plate inner surface 362, the retention plate inner surface 362 adapted to mechanically engage a biasing element distal end 364.

In one embodiment of the invention, illustrated in FIG. 26, the biasing element 318 includes a biasing element distal end 364 the biasing element distal end 364 adapted to mechanically engage a retention plate inner surface 362 and a biasing element proximate end 366, the biasing element proximate end 366 adapted to mechanically engage the biasing element receiving cavity 358. The biasing element 318 may operate to exert force upon the roller actuator assembly 316 when the retention plate 322 is removably secured to the base 312. The biasing element 318 is compressed between the roller actuator and the retention plate 322 when the retention plate 322 is removably secured to the base 312 because of the limited travel of the roller actuator in the direction of the projection receiving bore 320 and the fixed position of the retention plate 322 with respect to the biasing element 318. Compression of the biasing element 318 provides the force against the actuator assembly when the biasing element 318 is compressed.

Figure 21:
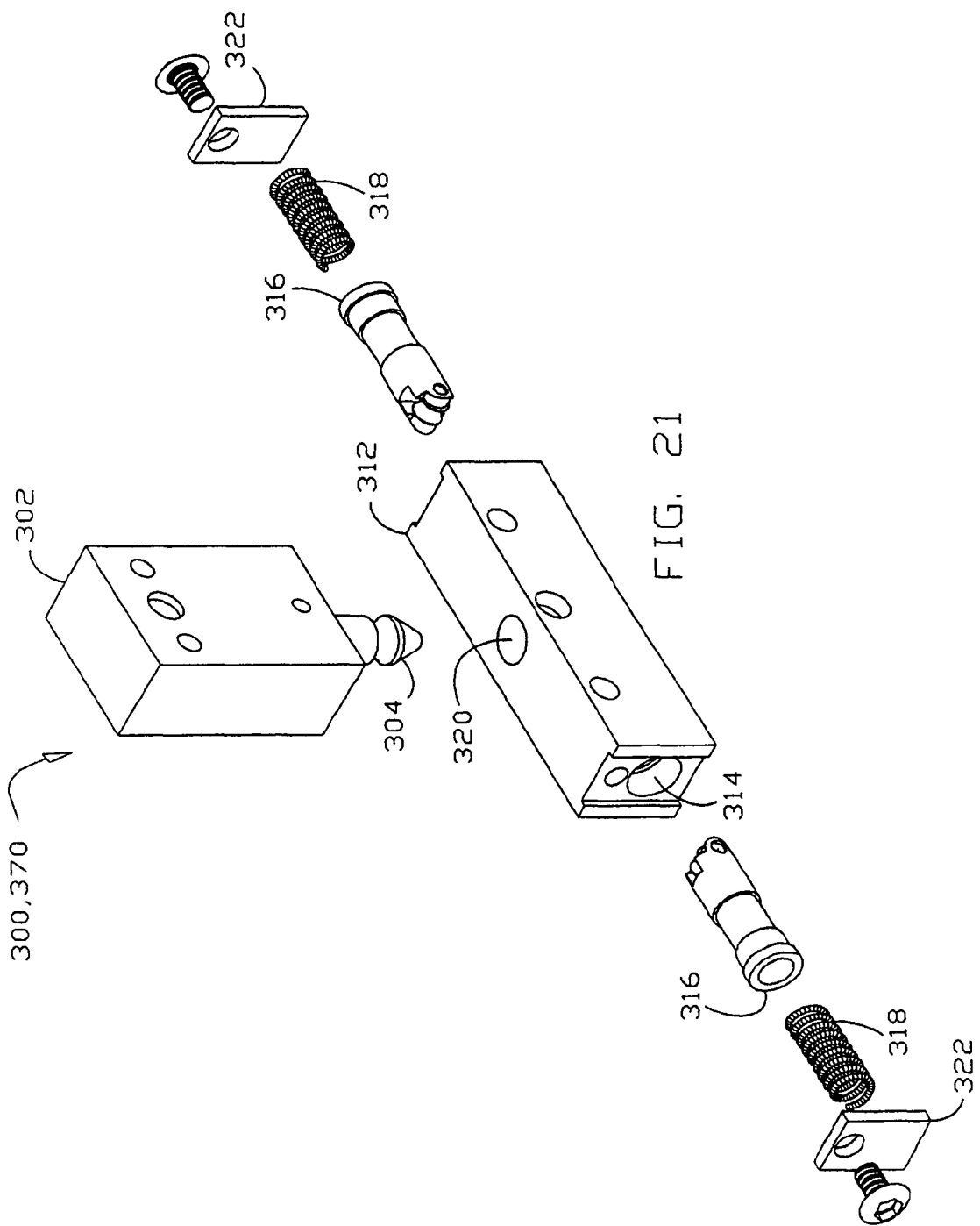
FIG. 21 is an exploded view of a locking device in accordance with an embodiment of the invention.

In one embodiment of the invention, illustrated in FIG. 26, the base 312 may include alignment protrusions 368, as illustrated in FIG. 21. The alignment protrusions 368 may operate to align the retention plates 322 with respect to the base 312 such that the retention plates 322 cover the longitudinal bore 314 and mechanically engage the biasing elements 318.

Figure 30:
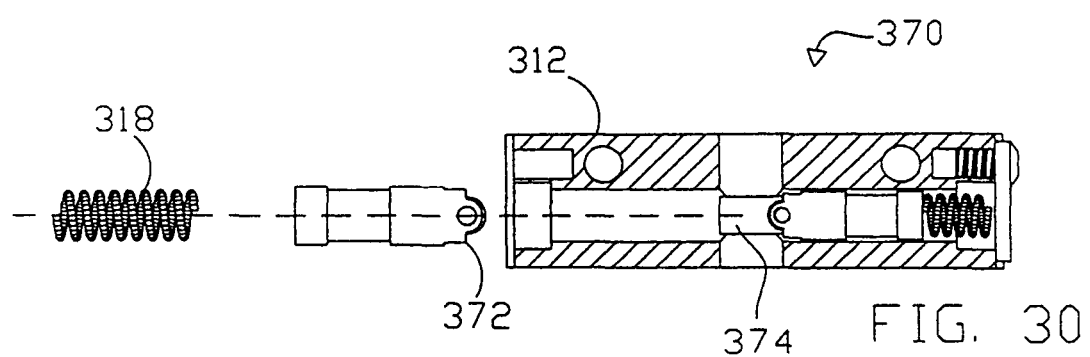
FIG. 30 is a cross sectional view of locking device including a roller actuator assembly having a perpendicular shoulder and a base having a rectangular bore in accordance with an embodiment of the invention.

In another embodiment of the invention, illustrated in FIGS. 26 and 27, the locking device 370 includes roller actuator assemblies that do not include a rim. In the embodiment of the invention illustrated in FIGS. 26 and 27, the travel of the roller actuator assemblies in the direction of the protrusion receiving bore is limited by a perpendicular shoulder 372 integrally formed with each respective roller actuator body portion 334, the shoulder 372 may be formed adjacent the yoke 350 of each respective roller actuator body portion 334, and adapted to mechanically engage a rectangular bore 374, as illustrated in FIG. 30.

In an embodiment of the invention, the shoulder 372 mechanically engages a rectangular bore 374 integrally formed in the base 312. The rectangular bore 374 may be formed coaxially with the longitudinal bore 314 and interested by the projection receiving bore 320 and may include a generally rectangular cross-sectional profile. The rectangular bore 374 may also be formed such that, when a roller actuator assembly 316 is forced in the direction of the projection receiving bore 320 by a biasing element 318, the rectangular bore 374 receives the roller actuator up to the shoulder 372, whereupon the shoulder 372 mechanically engages the rectangular bore 374 and prevents further movement of the roller actuator assembly 316 in the direction of the projection receiving bore 320. The shoulder 372, being formed adjacent the yoke 350, permits a portion of each of the yoke 350, the axle 340, and the roller 342 of each respective roller actuator assembly 316 to protrude into the protrusion receiving bore, such that the roller 342 may mechanically engage the protrusion, when the projection 304 is present in the projection receiving bore 320. FIG. 30 illustrates the shoulder 372 mechanically engaging the rectangular bore 374, whereby a portion of each of the yoke 350, the axle 340, and the roller 342 protrude into the protrusion receiving cavity.

In another embodiment of the invention, the rectangular bore 374 may include a square cross-sectional profile.

In one embodiment of the invention, the rectangular bore 374 may be formed by broaching.

In one embodiment of the invention, each of the shoulder 372 and the rectangular bore 374 may be hardened by hardening methods as are commonly known in the art. Each of the shoulder 372 and the rectangular bore 374 may be hardened to a hardness ranging between and including 40 and 70 on the Rockwell C hardness scale, as is commonly known in the art.

A method of use is also provided wherein a user provides a locking device including an upper block, the upper block including an axial cavity adapted to receive a projection therein and a projection retainer bore adapted to receive and mechanically engage a helically-threaded set screw via corresponding helical threads and adapted to be fixably secured to a first mold plate; a projection, the projection having an upper projection end and a lower projection end; a base, the base adapted to be removably secured to a second mold plate and including a longitudinal bore adapted to receive at least one roller actuator assembly and at least one biasing element therein and a transverse bore adapted to receive the projection therein; a plurality of roller actuator assemblies adapted to be received by the longitudinal bore and further adapted to mechanically engage the projection; a plurality of biasing elements, the biasing elements adapted to mechanically engage at least one roller actuator assembly and at least one retention plate; and a plurality of retention plates, the plurality of retention plates adapted to be removably secured to the base and further adapted to retain at least one roller actuator assembly and at least one biasing element within the longitudinal bore.

In another embodiment of the invention, a user may remove the set screw from mechanical engagement with the projection, whereby a user may incrementally rotate the projection within the axial cavity such that a portion of the projection that has not previously been in mechanical engagement with the at least one roller may be rotated into a position allowing that portion to mechanically engage the at least one roller. Incremental rotation of the projection within the axial cavity provides an unworn surface with each incremental rotation, whereby the locking device need not be replaced upon the projection becoming worn or damaged. Incremental rotation of the projection may provide a user of the locking device with substantial cost savings.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A locking device for use with a first and second mold plate, comprising:
   an upper block including an axial cavity integrally formed therein, the upper block adapted to be removably affixed to a first mold plate and further adapted to receive an upper projection end in the axial cavity;
   a projection having
      an upper projection end adapted to be received by the axial cavity, and
      a lower projection end adapted to be received by a projection receiving bore;
   a base adapted to be removably secured to a second mold plate, the base including
      a longitudinal bore adapted to receive at least one roller actuator assembly and at least one biasing element therein, and a projection receiving bore adapted to receive the lower projection end therein;

at least one roller actuator assembly adapted to be received by the longitudinal bore and further adapted to mechanically engage the lower projection end;

a plurality of biasing elements, each respective biasing element of the plurality of biasing elements adapted to mechanically engage at the least one roller actuator assembly and at least one retention plate; and a plurality of retention plates each adapted to be removably secured to the base and each being further adapted to retain the at least one roller actuator assembly and the at least one biasing element within the longitudinal bore.

2. The locking device of claim 1, wherein the projection further comprises a projection rebated portion, the projection rebated portion forming a portion of the projection having a smaller diameter than that of a body of the projection, and adapted to mechanically engage a threaded set screw.

3. The locking device of claim 2, wherein the upper block further comprises:

a projection retainer bore formed transversely therein, the projection retainer bore adapted to receive and mechanically engage the threaded set screw via corresponding helical threads.

4. The locking device of claim 3, wherein the locking device further comprises:

a set screw, the set screw adapted to mechanically engage the projection rebated portion and the projection retainer bore, whereby the projection is retained in a fixed orientation with respect to the upper block.

5. The locking device of claim 1, wherein the base is adapted to be removably affixed to the second mold plate and further comprises: at least one base mounting hole, the base mounting hole adapted to receive a mechanical fastener therethrough such that the mechanical fastener operates to removably secure the base to the lower mold plate by mechanically engaging a corresponding mechanical fastener formed or affixed to the second mold plate; and at least one retention member mounting hole, the retention member mounting hole adapted to receive a mechanical fastener therethrough.

6. The locking device of claim 5, wherein the base further comprises:

at least one limiting counterbore formed coaxially with the longitudinal bore.

7. The locking device of claim 6, wherein the at least one roller actuator assembly further comprises:

a rim portion formed at a roller actuator distal end and extending radially outward therefrom and adapted to engage a limiting counterbore formed in the base, thereby limiting the travel of the roller actuator assembly in the direction of the projection receiving bore within the longitudinal bore.

8. The locking device of claim 1, wherein the at least one roller actuator assembly further comprises:

a roller actuator body adapted to be received in sliding engagement with the longitudinal bore of the base and having
a body distal end, and
a body proximate end, the body proximate end adapted to receive an axle therein;

a roller having a transverse axle receiving bore centrally formed therethrough and adapted to receive an axle; and an axle, the axle adapted to mechanically engage a pair of diametrically-opposed bearing surfaces formed in the body proximate end and further adapted to mechanically engage the axle receiving bore of the roller.

9. The locking device of claim 8, wherein the roller further comprises:

a concave circumferential perimeter, the concave perimeter of the roller adapted to engage the projection such that both frictional and impact forces upon both the projection and the roller are reduced during operation of the locking device.

10. The locking device of claim 8, wherein the axle is retained in the bearing surfaces by a slip fit.

11. The locking device of claim 8, wherein the at least one roller actuator assembly further comprises:

an actuator rebated portion formed as a portion of the actuator body portion, the actuator rebated portion having a smaller diameter than that of a remainder of an actuator body portion and adapted to retain a lubricant therein.

12. The locking device of claim 8, wherein the at least one roller actuator assembly further comprises:

a biasing member receiving cavity, the biasing member receiving cavity integrally formed with the roller actuator body portion and adapted to receive a biasing member therein.

13. The locking device of claim 12, wherein the biasing member further comprises:

a biasing element distal end adapted to mechanically engage a retention plate inner surface; and a biasing element proximate end adapted to mechanically engage the biasing member receiving cavity.

14. A locking device for use with a first and a second mold plate, comprising:

an upper block adapted to be removably affixed to a first mold plate and further adapted to receive an upper projection end in an axial cavity integrally formed therein;

a projection having an upper projection end adapted to be received by the axial cavity and a lower projection end adapted to be received by a projection receiving bore;

a base adapted to be removably secured to the lower mold plate, the base including
a longitudinal bore adapted to receive at least one roller actuator assembly and at least one biasing element therein,
a rectangular bore formed coaxially with the longitudinal bore and intersected by a projection receiving bore, and
a projection receiving bore adapted to receive the lower projection end therein;

at least one roller actuator assembly adapted to be received by the longitudinal bore and further adapted to mechanically engage the lower projection end;

a plurality of biasing elements, each respective biasing element of the plurality of biasing elements adapted to mechanically engage at least one roller actuator assembly and at least one retention plate;

and a plurality of retention plates, the plurality of retention plates adapted to be removably secured to the base and further adapted to retain at least one roller actuator assembly and at least one biasing element within the longitudinal bore.

15. The locking device of claim 14, wherein the at least one roller actuator assembly further comprises:

a perpendicular shoulder, the perpendicular shoulder integrally formed with a respective roller actuator body portion adjacent a yoke of each respective roller actuator and adapted to mechanically engage the rectangular bore.

16. The locking device of claim 15, wherein the at least one roller actuator assembly further comprises:
   a biasing member receiving cavity adapted to receive a biasing member therein.

17. The locking device of claim 16, wherein the biasing member further comprises:
   a biasing element distal end adapted to mechanically engage a retention plate inner surface; and
   a biasing element proximate end adapted to mechanically engage the biasing member receiving cavity.

* * * * *